(12) United States Patent
Geerlings et al.

(10) Patent No.: US 10,471,546 B1
(45) Date of Patent: Nov. 12, 2019

(54) DISTRIBUTION OF DAMAGE VOLUMES IN LASER-INDUCED CHANNELS

(71) Applicant: Gentex Corporation, Zeeland, MI (US)

(72) Inventors: Kurtis L. Geerlings, Zeeland, MI (US); Donald L. Bareman, Zeeland, MI (US); Henry A. Luten, Holland, MI (US); Niels A. Olesen, Zeeland, MI (US); David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 238 days.

(21) Appl. No.: 14/580,206

(22) Filed: Dec. 22, 2014

Related U.S. Application Data

(60) Provisional application No. 61/919,696, filed on Dec. 20, 2013.

(51) Int. Cl.
*B23K 26/364* (2014.01)
*B23K 26/36* (2014.01)
*B23K 26/06* (2014.01)

(52) U.S. Cl.
CPC ........ *B23K 26/367* (2013.01); *B23K 26/0639* (2013.01)

(58) Field of Classification Search
CPC ............ B23K 26/0661; B23K 26/0624; B23K 26/362; B23K 26/402; B23K 2203/166; B23K 26/57; B23K 26/364; B23K 26/53; B23K 26/50; B23K 26/55; B23K 26/0639; B23K 26/367; B23K 2203/50; C23C 30/00; B29D 11/00596; G02F 1/153; B60R 1/088; G02B 19/0047; G02B 19/0052; G02B 19/0057; G02B 27/09; G02B 27/0916; G02B 27/0927
USPC ............ 219/121.67, 121.68, 121.69, 121.72, 219/121.54, 121.6, 121.66, 264, 482; 438/463, 797, 799, 113, 492; 359/362, 359/365, 366, 410, 426, 719
See application file for complete search history.

(56) References Cited

U.S. PATENT DOCUMENTS

| 8,842,358 B2 | 9/2014 | Bareman et al. |
| 2004/0002199 A1* | 1/2004 | Fukuyo ............ B23K 26/0057 438/460 |

(Continued)

OTHER PUBLICATIONS

U.S. Appl. No. 14/539,967, filed Nov. 12, 2014, Gentex Corporation.

*Primary Examiner* — Tu B Hoang
*Assistant Examiner* — Masahiko Muranami
(74) *Attorney, Agent, or Firm* — Foley & Lardner LLP; Bradley D. Johnson (57) ABSTRACT

A laser system is configured to produce a distribution of self-focus damage volumes through the thickness of a substrate. A laser of the laser system produces a laser beam, and an optical assembly receives the laser beam and emits a conditioned laser beam having a geometric focal region. Placing the substrate in the path of the conditioned beam shifts the focal region to an effective focal region. The optical assembly and/or optical elements thereof can be configured such that the distribution of self-focus damage volumes is uniform over the thickness of the substrate by accounting for the non-linear effects of the substrate on the light that propagates through the substrate.

16 Claims, 4 Drawing Sheets

(56) References Cited

U.S. PATENT DOCUMENTS

| | | | | |
|---|---|---|---|---|
| 2006/0022008 A1* | 2/2006 | Brown | ................... | B23K 26/06 |
| | | | | 225/1 |
| 2006/0099810 A1* | 5/2006 | Voronov | ............ | B23K 26/0624 |
| | | | | 438/689 |
| 2007/0051706 A1* | 3/2007 | Bovatsek | ........... | B23K 26/0617 |
| | | | | 219/121.69 |
| 2007/0111481 A1* | 5/2007 | Tamura | .............. | B23K 26/0057 |
| | | | | 438/463 |
| 2007/0193987 A1* | 8/2007 | Bischoff | ................. | A61F 9/007 |
| | | | | 219/121.73 |
| 2007/0298529 A1* | 12/2007 | Maeda | ............... | B23K 26/0057 |
| | | | | 438/33 |
| 2008/0242054 A1* | 10/2008 | Antonelli | ........... | B23K 26/0624 |
| | | | | 438/463 |
| 2010/0025387 A1* | 2/2010 | Arai | ........................ | B28D 5/00 |
| | | | | 219/121.69 |
| 2012/0234807 A1* | 9/2012 | Sercel | ................ | B23K 26/0608 |
| | | | | 219/121.69 |
| 2013/0126573 A1* | 5/2013 | Hosseini | ............ | B23K 26/0057 |
| | | | | 225/2 |

* cited by examiner

DISTRIBUTION OF DAMAGE VOLUMES IN LASER-INDUCED CHANNELS

TECHNICAL FIELD

The present disclosure generally relates to an optical assembly and, more particularly, to an optical assembly for a laser system and method thereof.

BACKGROUND

A substrate material can be separated into two or more pieces by forming a plurality of laser-induced channels along a process path located along an intended line of separation, as taught by Bareman et al. in U.S. Pat. No. 8,842,358. A laser-induced channel edge can be formed upon substrate separation and can have a relatively smooth surface without the need for post-processing operations such as grinding. The thickness of the substrate through which such laser-induced channels can be formed has been somewhat limited, as has the consistency of the laser-induced channels along the substrate thickness.

SUMMARY

According to at least one embodiment, a laser system includes a laser that produces a laser beam and a laser path having an optical assembly that receives the laser beam and emits a conditioned laser beam. The laser system is configured to form at least one laser-induced channel in a substrate, and each laser-induced channel includes a plurality of self-focus damage volumes. The optical assembly is configured to uniformly distribute the self-focus damage volumes of each of the laser-induced channels within an effective focal region that spans at least a portion of the thickness of the substrate.

According to at least one embodiment, a method includes the steps of: (a) providing a laser system having laser that produces a laser beam and an optical assembly that receives the laser beam and emits a conditioned laser beam toward a substrate with a known focal energy distribution in a geometric focal region defined along a direction of propagation, and (b) determining the location of an effective focal region along the direction of propagation. Step (b) includes considering the substrate as an optical element that affects focal characteristics of the laser beam.

BRIEF DESCRIPTION OF THE DRAWINGS

Illustrative embodiments will become more fully understood from the detailed description and the accompanying drawings, wherein.

DETAILED DESCRIPTION

Figure 1:
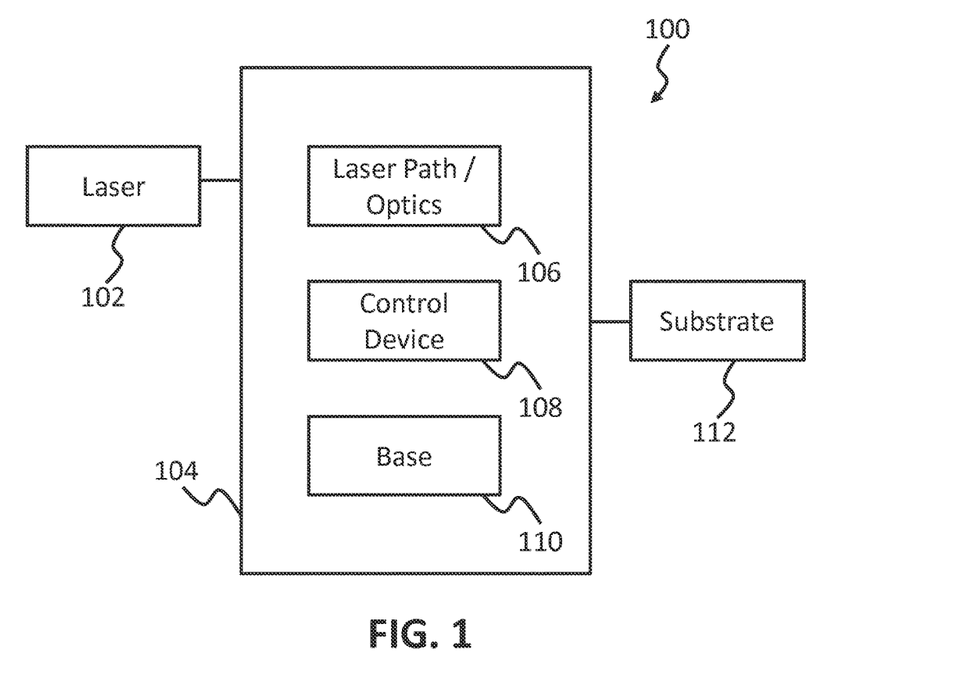
FIG. 1 is a block diagram of a laser system, in accordance with at least one embodiment.

In reference to FIG. 1, a laser system 100 can include a laser 102 that is in optical communication with a laser delivery assembly 104. The laser delivery assembly 104 can include a laser path or optics 106, a control device 108, and a base 110. The laser delivery assembly 104 can be configured to direct a beam emitted from the laser 102 to a substrate 112, as described in greater detail herein.

Figure 2:
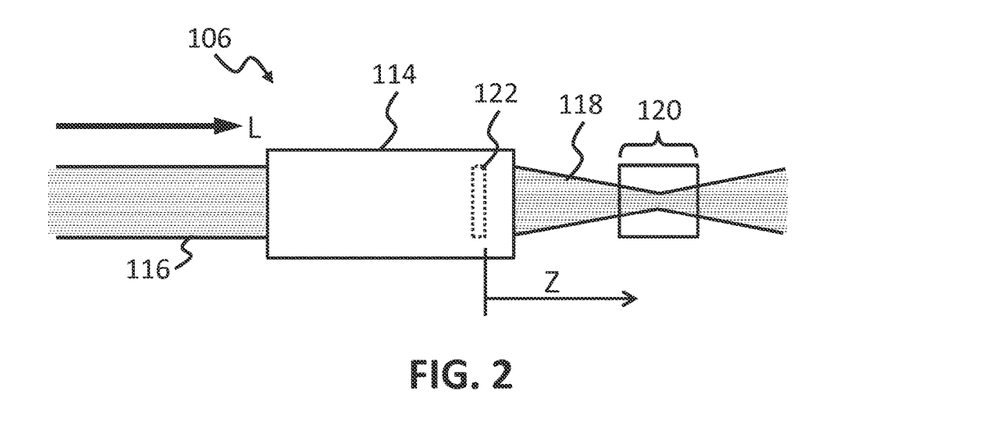
FIG. 2 illustrates a geometric focal region of a laser beam emitted by an optical assembly, in accordance with at least one embodiment.

In accordance with at least one embodiment, the laser path 106 can include at least one of a steering mirror and an optical assembly 114. As shown in FIG. 2, the optical assembly 114 may include one or more optical elements 122 (e.g., lenses or mirrors) and can be configured to receive an incoming beam of light 116 and emit a conditioned beam 118 with a geometric focal region 120 along a direction L of light propagation. The energy in the beam 118 can be focused along the focal region 120 with a given distribution to define a focal energy distribution.

Figure 3:
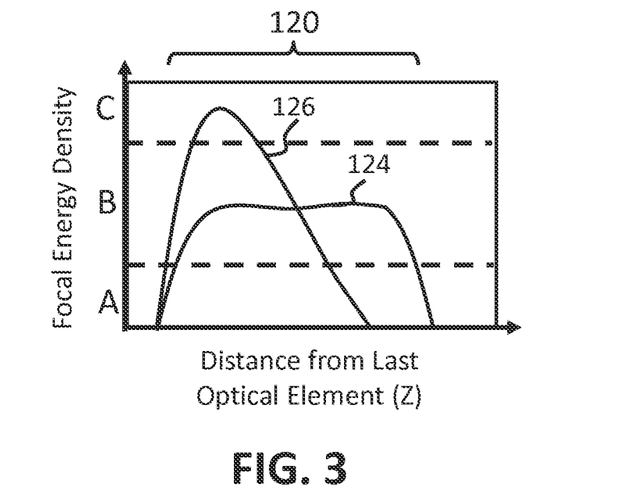
FIG. 3 is a diagram illustrating a plot of focal energy density in a geometric focal region as a function of distance from the last optical element, in accordance with at least one embodiment.

FIG. 3 illustrates two examples of focal energy distributions within the geometric focal region 120, including a uniform focal energy distribution 124 and a non-uniform focal energy distribution 126. Each focal energy distribution in these examples is representative of an amount of energy from a laser pulse that propagates through the optical assembly 114 and is focused as a function of a distance Z (in the direction of propagation) from the last optical element 122 in the laser path 106. Each focal energy distribution 124, 126 of FIG. 3 is a plot of focal energy density, which may be expressed in units of energy per unit length (e.g., J/m) as a function of distance Z. An integral of the focal energy distribution at all distances Z typically yields the laser pulse energy that propagates through the optical assembly 114. Energy that is lost due to stray reflection, scattering, absorption, or the like, within the optical assembly for example, and consequently not focused, is typically not included in the focal energy distribution.

Figure 4:
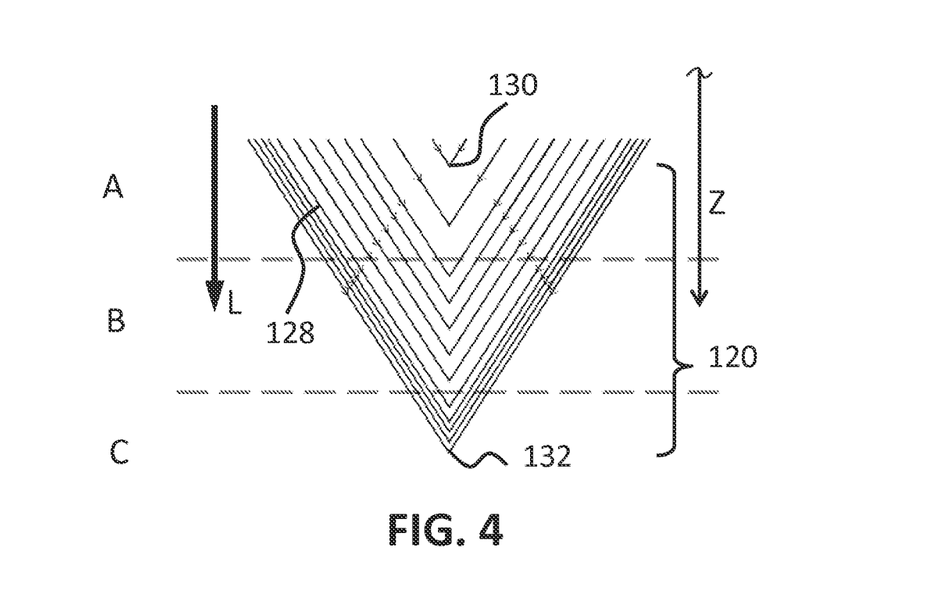
FIG. 4 is a diagram illustrating individual light paths focusing at different locations in a geometric focal region, in accordance with at least one embodiment.

FIG. 4 schematically illustrates one manner by which the geometric focal region 120 and the focal energy distribution for a given optical assembly or laser system can be defined and/or illustrated, which is linear optical ray tracing. This method is disclosed in greater detail in U.S. patent application Ser. No. 14/539,967 by Geerlings et al., which is incorporated herein by reference. In this technique, the laser beam 116 as received by the optical assembly 114, or by any optical element 122 within the optical assembly, has an areal (i.e., transverse) energy distribution across the width of the beam that can be represented as a plurality of light rays or paths having equal amounts of energy distributed according to the areal energy distribution of the incoming beam. Each ray is traced through each optical element of the optical assembly, changing direction at interfaces where the refractive index of the propagation medium changes, such as at entry and exit surfaces of each optical element.

FIG. 4 depicts the light rays 128 after the conditioned beam is emitted by the final optical element. The geometric focal region 120 is determined via linear optics, ray optics in this case, and can be defined between first and last points 130, 132 that are ascertainable along the direction L of propagation where sets of the rays 128 converge. In order to exclude end points of the region that approach infinity, the focal region may be defined by boundaries that include about 99% of the rays. In the example of FIG. 4, portions A, B, and C of the focal region 120 have respectively low, moderate, and high focal energy densities. The corresponding focal energy distribution associated with FIG. 4 is thus represented by a curve having increased focal energy density with increased distance Z within the focal region 120.

Figure 5:
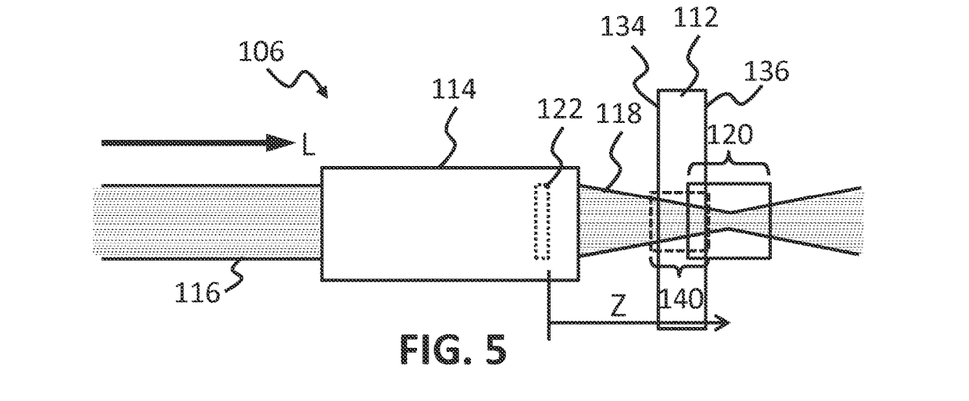
FIG. 5 illustrates a substrate in the path of the laser beam of FIG. 2 and the relative locations of the geometric focal region and an effective focal region.

FIG. 5 illustrates the substrate 112 in the path of the conditioned beam 118. When the substrate 112 is a Kerr material, a non-linear self-focusing of light within the substrate may occur by action of the optical Kerr effect. Self-focusing of the light can occur due to the non-linear susceptibility of Kerr materials which creates an index of refraction that increases in direct proportion to the intensity of light. As the index of refraction increases, the light can bend closer toward focus, which can cause the index to further increase. This can result in a self-focus effect that damages a volume of the substrate material once a certain intensity threshold is reached.

Figure 6:
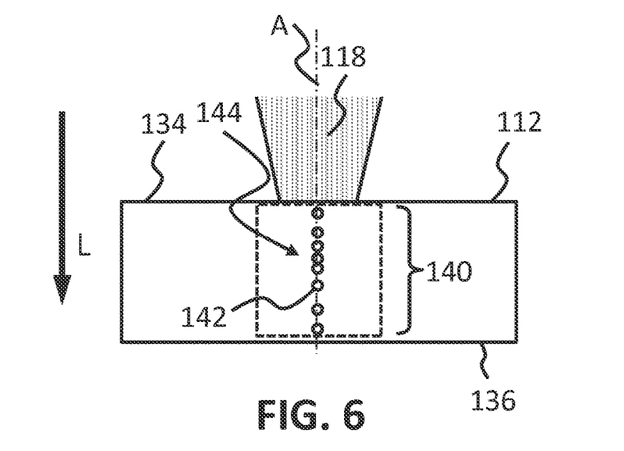
FIG. 6 illustrates an effective focal region and an exemplary distribution of self-focus damage volumes therealong.

With reference to FIG. 6, the region of distributed geometrical focus can produce a corresponding array of self-focus damage volumes 142 approximately along a line and about an axis A in a direction L of light propagation. The range of distances over which these damage volumes form may be closer to the optical assembly 114 (i.e., a lower value of Z) than the range of distances associated with the geometric focal region 120, but the two ranges may overlap. In FIG. 5, for example, the substrate 112 is located closer to the optical assembly 114 than is the geometric focal region 120, as the self-focusing effect of the substrate material effectively shifts the focal region to an effective focal region 140 when the substrate 112 is placed in the path of the beam 118. Thus, the geometric focal region 120 is the focal region as determined in the absence of the substrate 112, and the effective focal region 140 is the focal region as determined in the presence of the substrate.

A plurality of self-focus damage volumes 142, such as a linear array of self-focus damage volumes 142, can form a laser induced channel 144 within a material, spanning at least a portion of a thickness of a material or through the thickness of the material. The spacing among the damage volumes within a given laser induced channel may be such that some or all of the damage volumes overlap with other damage volumes of the same laser induced channel 144. Examples of laser induced channels, methods of forming them, and products made thereby are described in U.S. Pat. No. 8,842,358, issued on Sep. 23, 2014, which is hereby incorporated entirely herein by reference. A plurality of spaced-apart laser-induced channels 144 can be formed in a material, such as the substrate 112, along a process path representing a desired line of separation, and the material can be separated along the laser induced channels if sufficiently formed. According to at least one embodiment, a separation surface can be formed by a sequence of laser induced channels and optionally cracks or other damage in the substrate connecting the laser induced channels. The separation surface can be angled or perpendicular with respect to one or both opposite surfaces 134, 136 of the material.

It has been found that the spacing and intensity of changed material (i.e., damage volumes 142) within a given laser induced channel 144 can be related to the shape of the focal energy distribution in the geometric focal region 120. For example, as the energy density along the focal region 120 decreases, the corresponding damage volumes that form a laser induced channel tend to have a lesser intensity or presence (e.g., smaller, spaced farther apart, and/or weaker). And as the energy density along the focal region 120 increases, the corresponding damage volumes that form a laser induced channel tend to increase in intensity or presence (e.g., larger, spaced closer together, and/or stronger).

Referring again to FIG. 3, it has further been found that an approximately even or uniform focal energy distribution, such as focal energy distribution 124, along the geometric focal region 120 can produce approximately even damage intensity within and across the thickness of the substrate 112, resulting in a two dimensional separation surface along the line of separation that may appear substantially uniform. Stated differently, an approximately even focal energy distribution such as distribution 124 can enhance uniformity of the damage along the length of a laser induced channel 144, with respect to spacing, size, and or general appearance among the plurality of damage volumes 142 of the laser induced channel.

Uniformity of damage volumes within the laser induced channels 144 can provide a separation surface without visible alternating layers of damage/no damage or bands of strong/weak damage, in contrast to uneven distribution of damage volumes along the thickness of the substrate that may result from a non-uniform focal energy distribution, such as distribution 126 of FIG. 3. The non-uniform focal energy distribution 126 may produce laser induced channels with moderate damage (i.e., associated with region B) through only a small portion of the thickness of the substrate, with little or no damage in another portion of the thickness, and too much damage in yet another portion between regions of moderate damage. For example, a damage volume 142 associated with the peak of the non-uniform distribution 126 may show up as a visible line or band along the separation surface due perhaps to each individual laser induced channel along the separation surface having an enlarged diameter associated with the peak in the focal energy distribution 126.

However, even a perfectly uniform focal energy distribution in the geometric focal region 120 does not ensure a perfectly uniform array of damage volumes 142 along each laser-induced channel 144. Self-focusing of light within the substrate 112 material is non-linear, and the focal energy distribution is thus not simply shifted from the geometric focal region 120 to the effective focal region 140 with the shape of the distribution unchanged. As with the focal energy distribution in the geometric focal region 120, which is generally a calculated, simulated, or predicted characteristic of the conditioned laser beam 118, the distribution of damage volumes in the effective focal region 140 can also be calculated and predicted. However, such a calculation requires knowledge of various parameters including, but not limited to, first and third order susceptibilities of the substrate material, the form of the non-linear absorbance of the substrate, and parameters surrounding potential plasma generation and optical breakdown of the substrate material. These parameters must be known with a relative high level of accuracy to effectively predict the locations of the damage volumes and the effective focal region.

The effective focal region is also visibly apparent and can be evaluated and modified by an iterative process when damage volumes 142 and/or laser induced channels 144 are formed. In the laser induced channel 144 of FIG. 6, for example, an effective focal energy distribution is apparent in the distribution of damage volumes 142. One method of obtaining a desired distribution of damage volumes in the effective focal region may thus include starting with an optical assembly with a known geometric focal region, creating a first distribution of damage volumes in the substrate, adjusting the geometric focal region to change the focal energy distribution in a similar manner to the desired change in the effective focal region, and creating a second different distribution of damage volumes in another substrate. This process can be repeated until the desired damage volume distribution is achieved in the desired effective focal region.

The effective focal energy distribution in the effective focal region is thus analogous to the focal energy distribution of the geometric focal region, but accounts for non-linear effects of the substrate material. The uniformity of the effective focal energy distribution can be evaluated and is apparent from the visual uniformity of the separation surface along which the substrate is separated. For example, a banded appearance along the separation surface or edge of a separated substrate portion may indicate a non-uniform effective focal energy distribution manifested as a corresponding non-uniform distribution of damage volumes through the substrate thickness.

The effective focal energy distribution in the effective focal region 140 in FIG. 6 is sufficiently wide to extend through approximately the entire substrate thickness, but it is not perfectly uniform. In particular, the effective focal energy distribution along a lower portion of the substrate thickness in FIG. 6, from about midway through the thickness to the second surface 136, is lower than along an upper portion of the substrate thickness, from about midway through the thickness to the first surface 134. And within the upper portion of the substrate thickness, the effective focal energy density is higher near the center of the substrate than near the surface 134. It is noted that the particular distribution of damage volumes 142 illustrated in FIG. 6 is non-uniform and would likely result in a non-uniform appearance along the edges of substrate portions separated therealong. While the methods presented herein may be used to specifically tailor the distribution of damage volumes through the substrate thickness non-uniformly, if desired, uniform distributions of damage volumes are preferred where uniform separation surfaces are desired.

In accordance with various embodiments, the laser system 100 is configured to emit a conditioned laser beam 118 with a substantially uniform effective focal energy distribution in an effective focal region 140 defined along the direction L of propagation. In some embodiments, where it is desired to form laser-induced channels through the entire substrate thickness, the effective focal region 140 is selected to span at least the entire substrate thickness. It may be preferable to minimize the amount the effective focal energy distribution extends beyond the opposite substrate surfaces to optimize energy efficiency.

Figure 7:
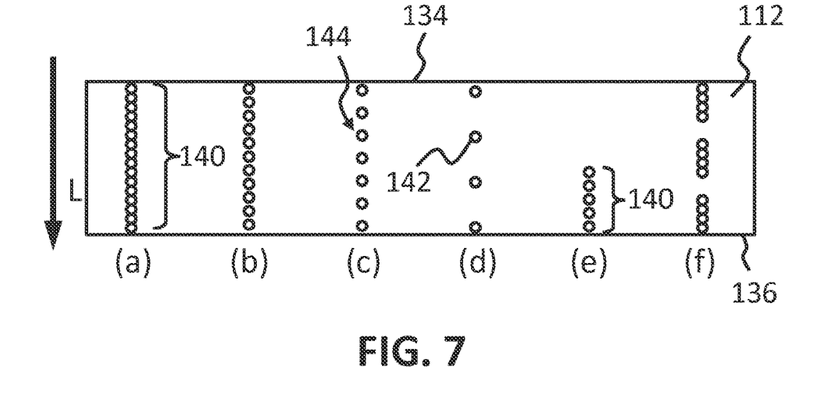
FIG. 7 illustrates various examples of uniform distributions of self-focus damage volumes.

In accordance with various embodiments, the laser system 100 and its associated optical element(s) are configured to provide an even distribution of self-focus induced damage volumes within the thickness of the substrate. Some examples of even distributions of damage volumes are given in FIGS. 7(a)-7(f). Each of FIGS. 7(a)-7(d) includes a laser-induced channel 144 including a plurality of self-focus damage volumes 142 evenly distributed along an effective focal region 140 that extends the full thickness of the substrate 112 from the first to the second surface 134, 136. The examples of FIGS. 7(a)-7(d) have respectively decreasing self-focus damage volume densities. The example of FIG. 7(e) includes a laser-induced channel 144 that extends only about halfway through the substrate 112 thickness but also includes a plurality of self-focus damage volumes 142 evenly distributed along an effective focal region 140. The example of FIG. 7(f) includes a laser-induced channel 144 with segments that extend partially into the thickness of the substrate 112 from both opposite surfaces 134, 136 with a central segment located therebetween. Each of the three segments of the laser-induced channel 144 of FIG. 7(f) includes a uniform distribution of self-focus damage volumes 142, and each segment may be considered to lie along a separate effective focal region 140.

Each laser-induced channel 144 may be considered to comprise a uniform array of damage volumes 142, and a plurality of such evenly spaced apart laser-induced channels in the substrate provides a uniform 2D array of damage volumes along which a separation surface can be formed. Each array of laser-induced damage channels comprises a linear or curvilinear plane of damage within the substrate. The plane comprises a 2D array of self-focus damage volumes. A plane with an even distribution of laser-damaged locations in both vertical (i.e., direction of substrate thickness) and horizontal (i.e., direction of laser process path) directions appears smooth and without structure to the naked eye. If the density of laser-damaged locations varies either vertically or horizontally, the plane may appear to have different properties in different locations, producing an uneven look.

With the application of chemical processes, physical stress, thermal stress, time, or a combination thereof, cracks (e.g., microcracks) may form between laser damaged locations. If cracks are continued between laser-induced damage channels across the full length of the material or around a closed contour, the material may be severed or separated into two separate pieces. The plane of damage within the material then becomes two opposing surfaces.

Figure 8:
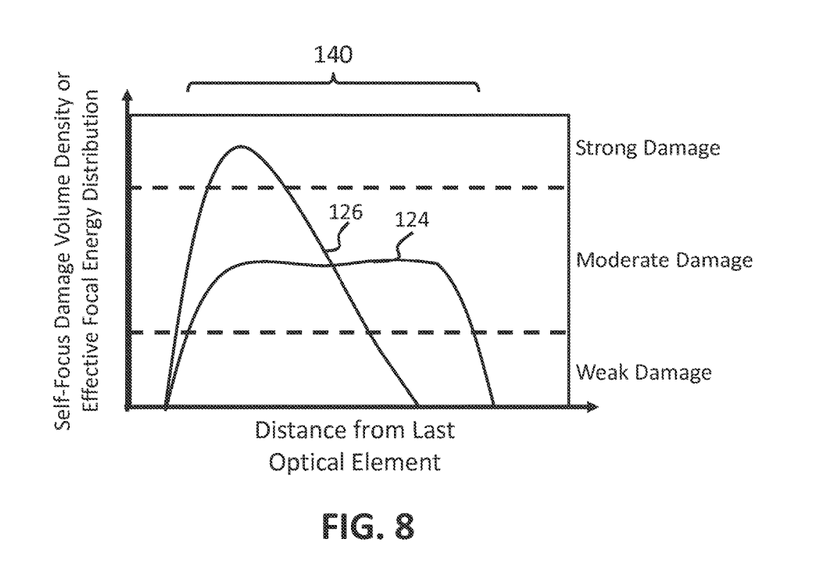
FIG. 8 is a diagram illustrating a plot of effective focal energy density or self-focus damage volume density in the effective focal region as a function of distance from the last optical element, in accordance with at least one embodiment.

FIG. 8 illustrates exemplary distributions of self-focus damage volume density along the direction of light propagation as a function of distance from the final optic. The shapes of these curves also represent the corresponding effective focal energy distributions in the above described effective focal region. An even distribution of laser-damaged locations may achieve a separation surface with visible properties that do not vary over large scales. If the vertical spacing (i.e., thickness direction) of damage volumes within a laser-induced damage channel are not even, a banded structure may appear where areas of low density and high density produce an edge with different roughness, transparency or diffusivity.

As noted above, when a Kerr material, which is a material with non-zero third-order susceptibility (or second order index of refraction), is placed within the path of the laser beam, the focal region changes from the geometric focal region to an effective focal region. For Kerr materials, the index of refraction increases with local electric field intensity. For laser beams with a higher intensity at the center of the areal energy distribution (like Gaussian beams), this causes rays of light on the periphery of the laser beam to bend toward the center of the beam. If the power of the laser beam is above a material-dependent critical power, the beam can catastrophically collapse, producing a beam waist smaller than that predicted by the focusing optics alone. The position of self-focus is dependent on the beam shape, beam energy and distance to the linear, geometric focus. The self-focus generally occurs before the linear, geometric focus, as shown in FIG. 5.

The electric field strength at the position of the self-focus is much higher than the surrounding areas. There exists a threshold electric field strength above which the material is damaged, possibly through ionization and/or optical breakdown. In at least some embodiments, this damage appears as a damage volume 142 of approximately 1-3 μm in diameter.

For a laser beam focused with a relatively wide focal energy distribution, portions of the laser beam may self-focus at several different locations along the direction of propagation, as shown in FIG. 6, for example. Depending at least in part on the profile of the focusing laser beam, partial self-focusing may occur that does not include the entire beam with the remaining portions of the beam possibly self-focusing at different locations.

The locations of self-focus damage volumes may be predicted for a given initial beam profile and a given set of focusing optical elements, where the substrate itself is considered an optical element. In one embodiment, the locations of self-focus damage volumes are predicted with non-linear ray-tracing, which accounts for the dependence of material index of refraction on local electric field intensity. Non-linear ray-tracing, as opposed to linear ray tracing, thus may be performed iteratively with respect to time since the propagation of each ray depends on the propagation of every other ray. In linear ray-tracing, on the other hand, the rays may be propagated independently. Other suitable types of iterative non-linear beam propagation techniques include finite difference time domain (FDTD) simulation and Hamiltonian ray tracing, to name a few.

Non-linear ray tracing of the Kerr effect, assuming the required material and beam parameters are accurately known, can help determine if and where portions of the beam (i.e., a number of rays representing a portion of the beam) will self-focus in the effective focal region. A given substrate material in which the beam experiences self-focusing will have a threshold energy density above which a damage volume is produced. Working backward from a desired distribution of self-focus damage volumes, shapes of optical element surfaces may thus be designed in order to produce an even distribution of self-focus damage volumes. In fact, there may also be cases where an uneven distribution of self-focus damage volumes is desired, and the same technique can be used to tailor or customize the distribution of damage volumes within the substrate thickness.

In one embodiment, an aspheric lens is designed using non-linear ray tracing and produces a uniform distribution of self-focus damage volumes in the substrate. Different lenses can be designed for different input beam profiles or widths, including, but not limited to, Gaussian and flat-top beam profiles. The self-focus damage volumes may be designed to extend fully through the substrate thickness or only through a portion of the substrate thickness.

Another method includes using two distinct lenses, such as two distinct cylindrical lenses, in which the beam is focused in two directions via two distinct cylindrical lenses. For instance, the beam may be focused along only a single axis (e.g., the x-axis) by one lens and independently focused along a different axis (e.g., the y-axis) by a second lens. Another method includes using an axicon lens, which may produce a beam profile with more energy in the outside of the beam than the center.

The resulting uniform effective focal energy distribution in the effective focal region represents a more efficient or optimized use of the energy contained in each laser pulse—i.e. excess energy is not wasted forming damage volumes that are unnecessarily large or intense at the expense of some other portion of the focal region having insufficient energy to form useful damage volumes. Considering, for example, the respective uniform and non-uniform distributions 124, 126 illustrated in FIG. 8, it is apparent that the total energy within the associated laser pulses (i.e., the area under each curve) is approximately the same for each distribution. But the energy in distribution 124 is distributed such that the energy density at any given distance Z falls within the moderate damage region along 90% or more of the focal region, while this is true for less than half of the focal region with the non-uniform distribution 126.

Therefore, the laser system 100 as configured to emit a laser beam with uniform distribution of damage volumes along the effective focal region 140 can form laser induced channels in a substantially transparent substrate, wherein the length of the laser induced channel is greater than a laser induced channel formed by a non-uniform focal energy distribution for any given pulse energy. In a non-limiting example in which a laser pulse with a non-uniform focal energy distribution can form a laser induced channel through only about 3 mm of a particular substrate, the uniform focal energy distribution can form a laser induced channel spanning up to 4 mm, greater than 4 mm, greater than 4.5 mm, greater than 5 mm, and/or greater than 6 mm of substrate thickness. These examples of substrate thickness are merely illustrative and intended to indicate that with any given laser process, it may be possible to increase the thickness of the substrate through which laser induced channels can be formed with proper attention to the focal energy distribution and designing and providing optical elements that result in a uniform energy distribution.

Use of the uniform focal energy density described here is not limited to laser processes that form laser induced channels through substantially the entire thickness of the substrate for purposes of separation. Other benefits may be realized by the enhanced efficiency of such an energy distribution. For instance, it may be desired to produce laser induced channels within a substrate that are uniform along their length (e.g., decorative or otherwise functional), and the uniform focal energy density described herein can provide such uniformity whether or not the laser induced channels extend entirely through the substrate thickness and regardless of the length of the channels with respect to the substrate thickness.

The uniformity of the effective focal energy distribution may be gauged is different ways, some of which are apparent in FIG. 8. According to at least one embodiment, an approximately even or uniform energy distribution may be characterized by the average effective energy density within a defined portion of the effective focal region being at least approximately 60% of the maximum effective energy density, at least approximately 70% of the maximum effective energy density, at least approximately 80% of the maximum effective energy density, at least approximately 90% of the maximum effective energy density, or a combination thereof. The portion of the effective focal region over which the average effective energy density is calculated may be a portion, continuous along the L direction, containing from 40% to 80% of the total effective energy in the focal region (i.e., the area under the entire curve). In different embodiments, the portion of the effective focal region over which the average effective energy density is calculated is a portion containing at least 40%, at least a majority, at least 60%, at least 70%, or at least 80% of the total effective energy in the effective focal region. In other embodiments, the portion of the effective focal region over which the average effective energy density is calculated is a central portion containing 40%, 50%, 60%, 70%, or 80% of the total effective energy in the focal region 140.

Since the effective focal energy distribution is a representation of self-focus damage volume distribution, uniformity may also be related to physical characteristics of the damage volumes and laser-induced channels. For instance, effective energy density may be analogous to damage volume per unit length or approximately proportional to damage volume width, with the total energy distributed along a laser-induced channel being analogous to the total volume of the damage volumes of the respective laser-induced channel. According to at least one embodiment, an approximately uniform distribution of damage volumes may be characterized by an average laser-induced channel width over a portion of the effective focal region being at least about 84% of the maximum channel width in the effective focal region, at least about 89% of the maximum channel width in the effective focal region, at least about 93% of the maximum channel width in the effective focal region, at least about 96% of the maximum channel width in the effective focal region, or a combination thereof. The portion of the effective focal region over which the average channel width is calculated may be a portion, continuous along the length of the laser-induced channel, containing from about 40% to 80% of the total laser-induced channel cross-sectional area. In different embodiments, the portion of the effective focal region over which the average channel width is calculated is a portion containing at least 40%, at least a majority, at least 60% at least 70%, or at least 80% of the total channel cross-sectional area. In other embodiments, the portion of the effective focal region over which the average channel width is calculated is a central portion containing 40%, 50%, 60%, 70%, or 80% of the total channel cross-sectional area.

According to at least one embodiment, an approximately even or uniform effective focal energy distribution may be characterized by a relationship between the minimum channel width and the maximum channel width over a defined portion of the effective focal region. For example, the minimum channel width may be a percentage of the maximum channel width over a defined portion of the effective focal region, where the defined portion represents some percentage of the total channel cross-sectional area. In different embodiments, the minimum channel width is at least 79%, at least 84%, at least 89%, or at least 93% of the maximum channel width within a defined portion of the effective focal region, where the defined portion of the effective focal region represents at least 50%, at least 60%, at least 70%, or at least 80% of the total channel cross-sectional area.

As used herein, the width of a laser-induced channel at any given location along the length of the channel is defined as the average width over a 25 µm segment of the channel centered at the given location. The maximum, minimum, and average channel width are the respective largest, smallest, and average of the channel widths along the entire length of the channel. The total cross-sectional area of a laser-induced channel is an integral of the width across the entire thickness of the substrate.

In one non-limiting example of laser parameters found sufficient to form laser induced channels in a transparent substrate such as glass, a laser pulse frequency is 100 kHz with the conditioned laser beam moving along the process path at 500 mm/s. This pulse frequency is equivalent to a laser pulse or pulse burst being delivered to the substrate every 10 µs. At a process speed of 500 mm/s, laser induced channels are formed with 5 µm spacing along the process path.

According to at least one embodiment, an apparatus includes a substantially transparent substrate having at least one laser-induced channel edge, wherein the edge includes a plurality of laser-induced channels, and the substrate is greater than 4 mm thick, greater than 4.5 mm thick, greater than 5 mm thick, and/or greater than 6 mm thick. At least one of the plurality of laser induced channels continuously extends from an entry surface 134 of the substantially transparent substrate to a depth thereof. According to at least one embodiment, at least one of the plurality of laser-induced channels spans at least a portion of the thickness of the substrate 112, such as a portion of the thickness that is greater than 3 mm, greater than 4 mm, greater than 4.5 mm thick, or greater than 5 mm thick. Each laser-induced channel may span a portion of the thickness of the substrate extending from an entry surface 134 (FIG. 5) of the substrate 112 to a depth thereof, extending from an exit surface 136 (FIG. 5), or extending from one point within the thickness of the substrate to another point within the thickness of the substrate. These are non-limiting examples, as substrates of any thickness may be processed to have a laser-induced channel edge with laser induced channels of any length.

For purposes of explanation and not limitation, an apparatus having a substrate with a laser induced channel edge as described herein can include an electro-optic device, an interior electrochromic mirror, an exterior electrochromic mirror, an aircraft electrochromic window, an architectural electrochromic window, a lens cover, a display cover, a display, a microscope slide, cover glass, a mobile phone component, a DNA slide, a bar code, a stain glass window, a light emitting diode, a data storage device, a sandwich assembly comprising a plurality of substantially transparent substrates, safety glasses, eye glasses, organic light emitting diodes, watch, a spring, a two-piece spotter mirror, a curved mirror, a flat-to-curved mirror, an aspheric mirror, an interposer, sapphire, and a household device.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method, comprising:
providing a laser system comprising a laser that produces a laser beam and
an optical assembly including at least one of a lens or a mirror that receives the laser beam and emits a conditioned laser beam toward a substrate;
impinging the conditioned laser beam onto the substrate to form a laser-induced channel in the substrate to at least partially define a line of separation within the substrate, the laser-induced channel comprising a plurality of self-focus damage volumes that extends along a thickness of the substrate, wherein the conditioned laser beam uniformly distributes each damage volume of the plurality of self-focus damage volumes of the laser-induced channel along the thickness of the substrate within an effective focal region of the conditioned laser beam that spans the thickness of the substrate, and wherein the conditioned laser beam has a uniform focal energy distribution along a direction of propagation of the conditioned laser beam within the effective focal region of the conditioned laser beam; and selectively controlling an energy density of the uniform focal energy distribution of the conditioned laser beam to facilitate modulating a spacing between the plurality of self-focused damage volumes.

2. The method of claim 1, wherein at least a portion of the plurality of self-focus damage volumes at least partially overlap.

3. The method of claim 1, wherein an average laser-induced channel width over a portion of the effective focal region is at least 84% of a maximum laser-induced channel width in the effective focal region for a given laser-induced channel, wherein the portion of the effective focal region contains at least 60% of the total laser-induced channel cross-sectional area.

4. The method of claim 3, wherein the average laser-induced channel width is at least 93% of the maximum laser-induced channel width and the portion of the effective focal region contains at least 80% of the total laser-induced channel cross-sectional area.

5. The method of claim 1, wherein a minimum laser-induced channel width is at least 89% of a maximum laser-induced channel width over a portion of the effective focal region for a given laser-induced channel, wherein the portion of the effective focal region contains at least 60% of the total laser-induced channel cross-sectional area.

6. The method of claim 5, wherein the minimum laser-induced channel width is at least 93% of the maximum laser-induced channel width and the portion of the effective focal region contains at least 80% of the total laser-induced channel cross-sectional area.

7. The method of claim 1, wherein the average laser-induced channel width across the effective focal region is at least 84% of the maximum laser-induced channel width.

8. The method of claim 1, wherein the plurality of self-focus damage volumes do not overlap.

9. The method of claim 1, wherein the conditioned laser beam facilitates generating the plurality of self-focus damage volumes within the substrate that extend more than 3 mm along the thickness of the substrate.

10. The method of claim 9, wherein the conditioned laser beam facilitates generating the plurality of self-focus damage volumes within the substrate that extend at least 4 mm along the thickness of the substrate.

11. The method of claim 1, wherein the conditioned laser beam has a Gaussian beam profile.

12. The method of claim 1, wherein the conditioned laser beam has a geometric focal region that is positioned further along the direction of propagation of the conditioned laser beam than the effective focal region.

13. The method of claim 12, wherein the geometric focal region at least partially overlaps the effective focal region.

14. A method comprising:
providing a laser system having a laser that produces a laser beam having a beam profile and an optical assembly including at least one of a lens or a mirror that receives the laser beam and emits a conditioned laser beam toward a substrate with a known focal energy distribution in a geometric focal region defined along a direction of propagation; and determining a location of an effective focal region along the direction of propagation, wherein determining the location of the effective focal region along the direction of propagation includes:
considering the substrate as an optical element that affects focal characteristics of the conditioned laser beam; and
predicting the location of the effective focal region along the direction of propagation based on (i) the beam profile of the laser beam, (ii) the known focal energy distribution in the geometric focal region of the conditioned laser beam, and (iii) optical characteristics of the substrate; and placing the substrate in the path of the conditioned beam and forming a laser-induced channel comprising a plurality of self-focus damage volumes uniformly distributed across the thickness of the substrate within the effective focal region.

15. The method of claim 14, wherein the location of the effective focal region along the direction of propagation is predicted using an iterative non-linear beam propagation calculation, wherein the non-linear beam propagation calculation includes non-linear ray tracing.

16. The method of claim 14, wherein the plurality of self-focus damage volumes do not overlap.

* * * * *